United States Patent
Malischewski et al.

(10) Patent No.: US 11,359,525 B2
(45) Date of Patent: Jun. 14, 2022

(54) DEVICE AND METHOD FOR LUBRICATING A CONNECTING ROD BEARING

(71) Applicant: MAN Truck & Bus AG, Munich (DE)

(72) Inventors: Thomas Malischewski, Heilsbronn (DE); Jens Dietrich, Heilsbronn (DE); Steffen Hirschmann, Neustadt an der Aisch (DE); Dominik Renner, Ansbach (DE)

(73) Assignee: MAN Truck & Bus AG, Munich (DE)

( * ) Notice: Subject to any disclaimer, the term of this patent is extended or adjusted under 35 U.S.C. 154(b) by 602 days.

(21) Appl. No.: 16/213,726

(22) Filed: Dec. 7, 2018

(65) Prior Publication Data
US 2019/0186309 A1   Jun. 20, 2019

(30) Foreign Application Priority Data

Dec. 20, 2017   (DE) .......................... 102017130690.0

(51) Int. Cl.
*F01M 1/06* (2006.01)
*F16C 33/10* (2006.01)
(Continued)

(52) U.S. Cl.
CPC ............... *F01M 1/06* (2013.01); *F16C 7/023* (2013.01); *F16C 33/1045* (2013.01);
(Continued)

(58) Field of Classification Search
CPC . F01M 1/06; F01M 1/08; F01M 11/02; F01M 2001/066; F01M 2001/083;
(Continued)

(56) References Cited

U.S. PATENT DOCUMENTS

| 4,690,038 A | * | 9/1987 | Klie | F16J 1/22 |
|---|---|---|---|---|
| | | | | 92/157 |
| 4,905,577 A | * | 3/1990 | Schneeweiss | F16J 1/14 |
| | | | | 384/245 |

(Continued)

FOREIGN PATENT DOCUMENTS

| CN | 102705101 A | 10/2012 |
|---|---|---|
| DE | 4135237 A1 | 4/1993 |

(Continued)

OTHER PUBLICATIONS

Machine translation, WO2016104171A1, Taniguchi et al., originally published Jun. 30, 2016, obtained from https://worldwide.espacenet.com/, pp. 1-8. (Year: 2016).*

(Continued)

*Primary Examiner* — Grant Moubry
(74) *Attorney, Agent, or Firm* — Maginot, Moore & Beck LLP

(57) ABSTRACT

A device lubricates a connecting rod bearing on a crankshaft of an internal combustion engine. The device has a piston having an internal piston cooling fluid channel, and an outlet channel in fluid communication with the fluid channel. The device has a connecting rod, which is connected to the piston in an articulated, in particular pivotable, manner, and has a large connecting rod eye and a connecting channel. The large connecting rod eye is formed for receiving the connecting rod bearing. The connecting channel forms a fluid connection between the outlet channel and the large connecting rod eye so that a fluid, in particular a cooling lubricating fluid (e.g. oil), can be fed, or is fed, from the fluid channel to the large connecting rod eye via the outlet channel and the connecting channel. The connecting rod bearing can be lubricated by cooling oil from the fluid channel of the piston.

17 Claims, 3 Drawing Sheets

Figure 1:
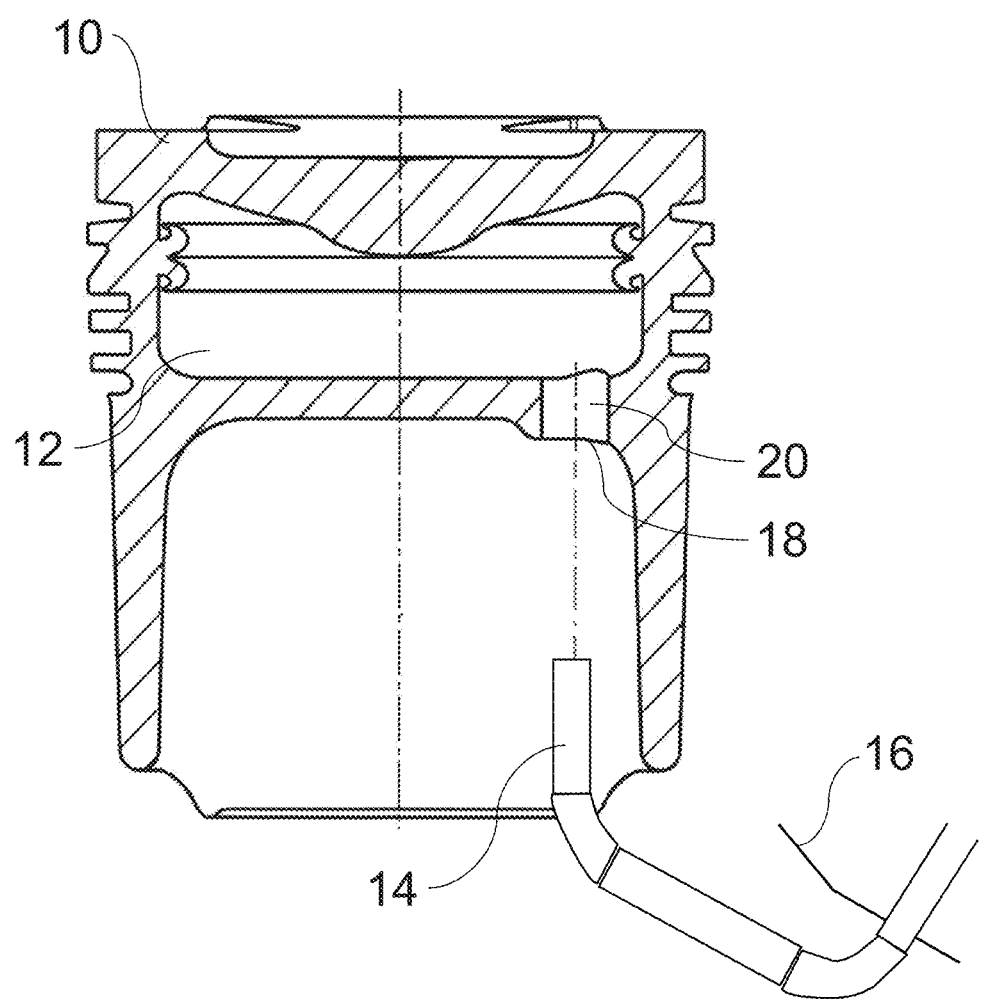

(51) Int. Cl.
*F16C 7/02* (2006.01)
*F02F 3/22* (2006.01)
*F01M 1/08* (2006.01)
*F16C 37/00* (2006.01)
*F16J 1/09* (2006.01)
*F01M 11/02* (2006.01)

(52) U.S. Cl.
CPC . *F01M 2001/066* (2013.01); *F01M 2001/083* (2013.01); *F01M 2001/086* (2013.01); *F01M 2011/027* (2013.01); *F02F 3/22* (2013.01); *F16C 37/007* (2013.01); *F16J 1/09* (2013.01)

(58) Field of Classification Search
CPC ........ F01M 2001/086; F01M 2011/027; F16C 7/023; F16C 33/1045; F16C 37/007; F02F 3/22; F16J 1/14; F16J 1/09; F01P 3/12; F01P 3/06; F01P 3/08
See application file for complete search history.

(56) References Cited

U.S. PATENT DOCUMENTS

| | | | | |
|---|---|---|---|---|
| 4,945,864 | A * | 8/1990 | Solomon | F01M 1/08 123/193.6 |
| 6,209,510 | B1 * | 4/2001 | Brogdon | F02B 75/246 123/197.2 |
| 6,250,275 | B1 * | 6/2001 | Bock | F01M 1/08 123/196 R |
| 6,334,385 | B1 * | 1/2002 | Wilksch | F02F 3/22 92/159 |
| 10,208,704 | B2 * | 2/2019 | Mackenzie | F01M 1/08 |
| 2005/0284424 | A1 * | 12/2005 | Jones | F01P 3/10 123/41.38 |
| 2014/0083390 | A1 * | 3/2014 | Azevedo | F16J 1/005 123/193.6 |
| 2015/0128920 | A1 * | 5/2015 | Kessler | F01M 1/06 123/61 R |
| 2015/0159583 | A1 * | 6/2015 | Pisila | F16J 1/18 123/193.6 |
| 2016/0305363 | A1 * | 10/2016 | Leone | F16C 7/023 |
| 2017/0009699 | A1 * | 1/2017 | Nguyen | F02F 3/0069 |

FOREIGN PATENT DOCUMENTS

| | | | | |
|---|---|---|---|---|
| DE | 29723973 | U1 | 10/1999 | |
| DE | 10251943 | B3 * | 7/2004 | F16J 1/22 |
| DE | 102004048939 | A1 | 5/2005 | |
| DE | 102004032590 | A1 | 2/2006 | |
| DE | 102017204316 | A1 | 9/2017 | |
| DE | 102018122249 | A1 * | 3/2019 | F16J 1/08 |
| JP | H094463 | A | 1/1997 | |
| JP | 2005331056 | A | 2/2005 | |
| JP | 2005331056 | A | 12/2005 | |
| JP | 2010127248 | A | 6/2010 | |
| KR | 1020040040919 | A | 5/2004 | |
| WO | 0063538 | A1 | 10/2000 | |
| WO | WO-2016104171 | A1 * | 6/2016 | F02F 3/22 |

OTHER PUBLICATIONS

Machine translation, Detailed Descrition, JP2005331056A, Katayama, published Dec. 2, 2005, obtained from https://worldwide.espacenet.com/, pp. 1-5 (Year: 2005).*
European Search report for related application No. EP 18205588.9, dated Jan. 3, 2019.
German Search report for related application No. DE 102017130690.0, dated Jul. 20, 2018.
Chinese Office Action in related case CN 201811493677.8 dated Oct. 15, 2021. (8 pages).
English Translation of Chinese Office Action in related case CN 201811493677.8. (5 pages).

* cited by examiner

DEVICE AND METHOD FOR LUBRICATING A CONNECTING ROD BEARING

The invention relates to a device and a method for lubricating a connecting rod bearing on a crankshaft of an internal combustion engine.

It is known for a connecting rod bearing on a crankpin of a crankshaft to be supplied with lubricating oil from the inside through the crankshaft. To this end, a groove can be incorporated in a main bearing shell of a main bearing of the crankshaft, which groove is supplied with pressure oil. Via a bore in the crankshaft from the main bearing to the connecting rod bearing on the crankpin of the crankshaft, the oil can flow to the connecting rod bearing so long as the bore in the main bearing overlaps the groove in the main bearing shell. A lubricating device of this type is known for example from DE 10 2004 032 590 A1.

DE 10 2004 048 939 A1 further discloses a connecting rod, which has a connecting rod body having a crankpin bore (large connecting rod eye) formed in a first end (big end) and a pin bore (small connecting rod eye) formed in a second end (small end). The connecting rod has a tube which is connected to the connecting rod body to convey lubricant from the first end to the second end.

In the known lubricating devices for connecting rod bearings, it can be disadvantageous that the bores in the crankshaft can only be produced in a complex and cost-intensive manner. The bores can further reduce the durability of the crankshaft. Supplying the connecting rod bearing with lubricating oil via the main bearing shells additionally requires a high oil throughput, which must be provided by an oil pump which, to this end, must be dimensioned accordingly and driven through energy consumption (fuel consumption).

The invention is based on the object of providing an alternative and/or improved device or an alternative and/or improved method for lubricating a connecting rod bearing of a crankshaft, by means of which it is, in particular, possible to overcome disadvantages of the prior art.

The object is achieved by a device and a method according to the independent claims. Advantageous further developments are described in the dependent claims and the description.

The device is suitable for lubricating a connecting rod bearing on a crankshaft of an internal combustion engine. The device has a piston having a fluid channel, in particular an internal piston cooling fluid channel, and an outlet channel which is in fluid communication with the fluid channel. The device has a connecting rod, which is connected to the piston in an articulated, in particular pivotable, manner and has a large connecting rod eye (or a crankpin bore) and an (in particular internal) connecting channel. The large connecting rod eye is formed for receiving the connecting rod bearing. The connecting channel forms a fluid connection between the outlet channel and the large connecting rod eye, so that a fluid, in particular a cooling lubricating fluid (e.g. oil), can be fed, or is fed, from the fluid channel to the large connecting rod eye via the outlet channel and the connecting channel.

The connecting rod bearing on the crankshaft can thus be lubricated by means of cooling oil from the piston. In particular, the connecting rod bearing can be lubricated by means of cooling oil from the internal piston cooling channel of the piston. The cooling oil therefore also serves as lubricating oil. It is thus possible to dispense with all lubricating oil bores in the crankshaft. The durability of the crankshaft can thus be increased considerably and the costs reduced. Furthermore, it is possible to dispense with the bearing grooves in the main bearing shells, which can minimise the oil throughput considerably and lead to savings in fuel consumption.

In one exemplary embodiment, the outlet channel has an outlet opening in an, in particular rounded, piston head of the piston. Alternatively or additionally, the connecting channel has an inlet opening in an, in particular rounded, outer surface, in particular an outer circumferential surface, of a small end of the connecting rod. A cooling lubricating fluid, for example oil, can therefore be provided from the internal piston cooling channel in a piston head for introduction into the connecting channel. The cooling lubricating fluid can be introduced into the connecting channel in a small end of the connecting rod. The rounding of the piston head and the small end enables the piston head and the small end to sweep over one another whilst the piston moves up and down and the connecting rod is thereby pivoted relative to the piston.

In a further exemplary embodiment, the connecting channel has an inlet region, which is formed by an, in particular step-shaped, recess in an outer surface, in particular an outer circumferential surface, of a small end of the connecting rod. The step-shaped recess enables an inlet region of the connecting channel to be produced in a simple manner so that, depending on the angular position between the piston and the connecting rod, it is possible for the inlet region to be overlapped by the outlet opening of the outlet channel or covered by the piston head for closing the connecting channel.

In a further development, the connecting channel has a slant bore, which extends from the recess and, at a spacing from a small connecting rod eye of the connecting rod, through the small end to a connecting rod shaft of the connecting rod. The connecting channel optionally further has a longitudinal bore, which extends from the large connecting rod eye through the connecting rod shaft to the slant bore. The slant bore enables the small connecting rod eye to be bypassed by the connecting channel. The bores can further be produced in a simple manner. Starting from a base of the recess, the slant bore can be drilled through the small end to the connecting rod shaft. Starting from the large connecting rod eye, the longitudinal bore can be drilled through the connecting rod shaft until the longitudinal bore meets the slant bore. The bores can each be constructed as blind boreholes which meet at their respective ends to form the connecting channel.

In a further exemplary embodiment, a small end of the connecting rod and a piston head of the piston are adapted to one another so that a spacing between a region of the piston head which adjoins an outlet opening of the outlet channel and a region of the small end which adjoins an inlet opening of the connecting channel is smaller than 0.1 cm, in particular smaller than 0.01 cm. For example, the spacing can be between 0.01 cm and 0.001 cm. To produce the spacing accurately, it can be necessary to precision-machine the corresponding regions of the piston head and the small end. The slight spacing enables fluid to flow into the connecting channel from the outlet channel without substantial leakage. The leakage which occurs results in the lubrication between the regions. The slight spacing moreover enables the connecting channel to be substantially closed by the head surface when the piston head covers the inlet opening of the connecting channel, for example upon a downward movement of the piston and the connecting rod.

In a further development, the region of the piston head and the region of the small end sweep over one another during a pivotal movement between the piston and the connecting rod. As a result of the sweeping movement, which preserves the spacing between the regions, it is possible for the outlet opening of the outlet channel and the inlet opening of the connecting channel to overlap during a first part of the pivotal movement. Additionally, the outlet opening of the outlet channel and the inlet opening of the connecting channel do not overlap during a second part of the pivotal movement. In this case, the region of the piston head can cover the connecting channel and therefore substantially close it.

In one embodiment, a piston head of the piston covers an inlet opening of the connecting channel during a movement of the piston from an upper dead centre to a lower dead centre, in particular for reducing the cavitation tendency in the connecting channel. Alternatively or additionally, an outlet opening of the outlet channel overlaps an inlet opening of the connecting channel, in particular only, during a movement of the piston from a lower dead centre to an upper dead centre. The connecting channel can therefore be filled with fluid from the outlet channel during the upward movement of the piston. Owing to the high acceleration of the piston and the connecting rod during the upward movement, high fluid pressures, for example up to 6 bar, can be achieved here, by means of which the fluid can be fed to the connecting rod bearing. To prevent cavitation of the fluid in the connecting channel during the downward movement of the connecting rod, the inlet opening of the connecting channel can be closed by the piston head of the piston during the downward movement of the connecting rod. The cavitation can thus be prevented or at least reduced, whereby the throughflow through the connecting channel during the next upward movement is not, or is barely, influenced.

In particular, an inlet opening of the connecting channel and an outlet opening of the outlet channel can be adapted to one another so that the fluid can be fed, or is fed, from the outlet channel into the connecting channel, in particular only, whilst the piston moves from a lower dead centre to an upper dead centre. Alternatively or additionally, an inlet opening of the connecting channel and an outlet opening of the outlet channel can be adapted to one another so that the fluid cannot be fed, or is not fed, from the outlet channel into the connecting channel whilst the piston moves from an upper dead centre to a lower dead centre.

In a further embodiment, a piston head of the piston covers an inlet opening of the connecting channel within an angular range which is smaller than a specified angular range within which the connecting rod is pivotably connected to the piston. In other words, the connecting rod pivots during the upward and downward movement within the specified angular range relative to the piston. During this pivotal movement, the piston head of the piston covers the inlet opening of the connecting channel only temporarily, i.e. within an angular range which is smaller than the specified angular range.

Alternatively or additionally, an outlet opening of the outlet channel overlaps an inlet opening of the connecting channel within an angular range which is smaller than a specified angular range within which the connecting rod is pivotably connected to the piston. In other words, the connecting rod pivots during the upward and downward movement within the specified angular range relative to the piston. During this pivotal movement, the outlet opening of the outlet channel overlaps the inlet opening of the connecting channel only temporarily, i.e. within an angular range which is smaller than the specified angular range.

The pivotal connection between the connecting rod and the piston during the upward and downward movement is therefore used specifically to free or cover the inlet opening of the connecting channel. For example, the specified angular range can be between 30° and 40°.

The angular range within which the outlet opening of the outlet channel overlaps the inlet opening of the connecting channel can then be between 10° and 20°, for example. The angular range within which the piston head covers the inlet opening of the connecting channel can be between 15° and 30°, for example.

In one variant embodiment, a fluid connection between the outlet channel and the connecting channel is an intermittent fluid connection and/or exists substantially only during a movement of the piston from a lower dead centre to an upper dead centre. The upward movement of the piston and the connecting rod can therefore be used specifically to convey the fluid from the outlet channel to the connecting rod bearing through the connecting channel.

In a further variant embodiment, the connecting channel bypasses a small connecting rod eye (or a piston pin bore) of the connecting rod and/or a piston pin which connects the connecting rod pivotably to the piston.

In one exemplary embodiment, a small end of the connecting rod is provided with an increased wall thickness in a region through which the connecting channel extends. Alternatively and/or additionally, the piston is provided with an increased wall thickness in a region through which the outlet channel extends. The increased wall thicknesses enables a convergence between the small end and the piston head. It is therefore possible to precision-machine the piston head and the small end, which enables the production of a very small spacing between the piston head and the small end in the regions of the outlet opening of the outlet channel and the inlet opening of the connecting channel.

In a further exemplary embodiment, the device has a fluid injecting nozzle, which is directed towards an inlet opening of an inlet channel of the piston which is in fluid communication with the fluid channel. Via the fluid injecting nozzle, oil can be injected into the fluid channel via the inlet channel. In addition to cooling the piston, this oil can be used so that it is directed via the outlet channel and the connecting channel to the connecting rod bearing in order to lubricate this latter.

In particular, the fluid injecting nozzle can be supplied with a cooling lubricating fluid, for example oil, from a cooling lubricating circuit of the internal combustion engine.

In a further exemplary embodiment, the fluid injecting nozzle is provided separately from the piston and from the connecting rod. Alternatively or additionally, the fluid injecting nozzle is received or secured in or on a crankcase.

In particular, the fluid channel can extend annularly in the piston.

In particular, the crankshaft can be without bores for supplying the connecting rod bearing with lubricating oil.

The invention also relates to a motor vehicle, in particular a commercial vehicle (for example a bus or heavy goods vehicle) having a device as disclosed herein.

It is also possible to use the device as disclosed herein for cars, large engines, off-road vehicles, stationary engines, marine engines etc.

In addition, the invention also relates to a method for lubricating a connecting rod bearing on a crankshaft. The method comprises feeding a fluid, in particular a cooling lubricating fluid (for example oil), from a fluid channel, in particular an internal cooling fluid channel, of a piston to the connecting rod bearing via a connecting channel of a connecting rod.

In particular, the method can use the device disclosed herein.

Figure 2:
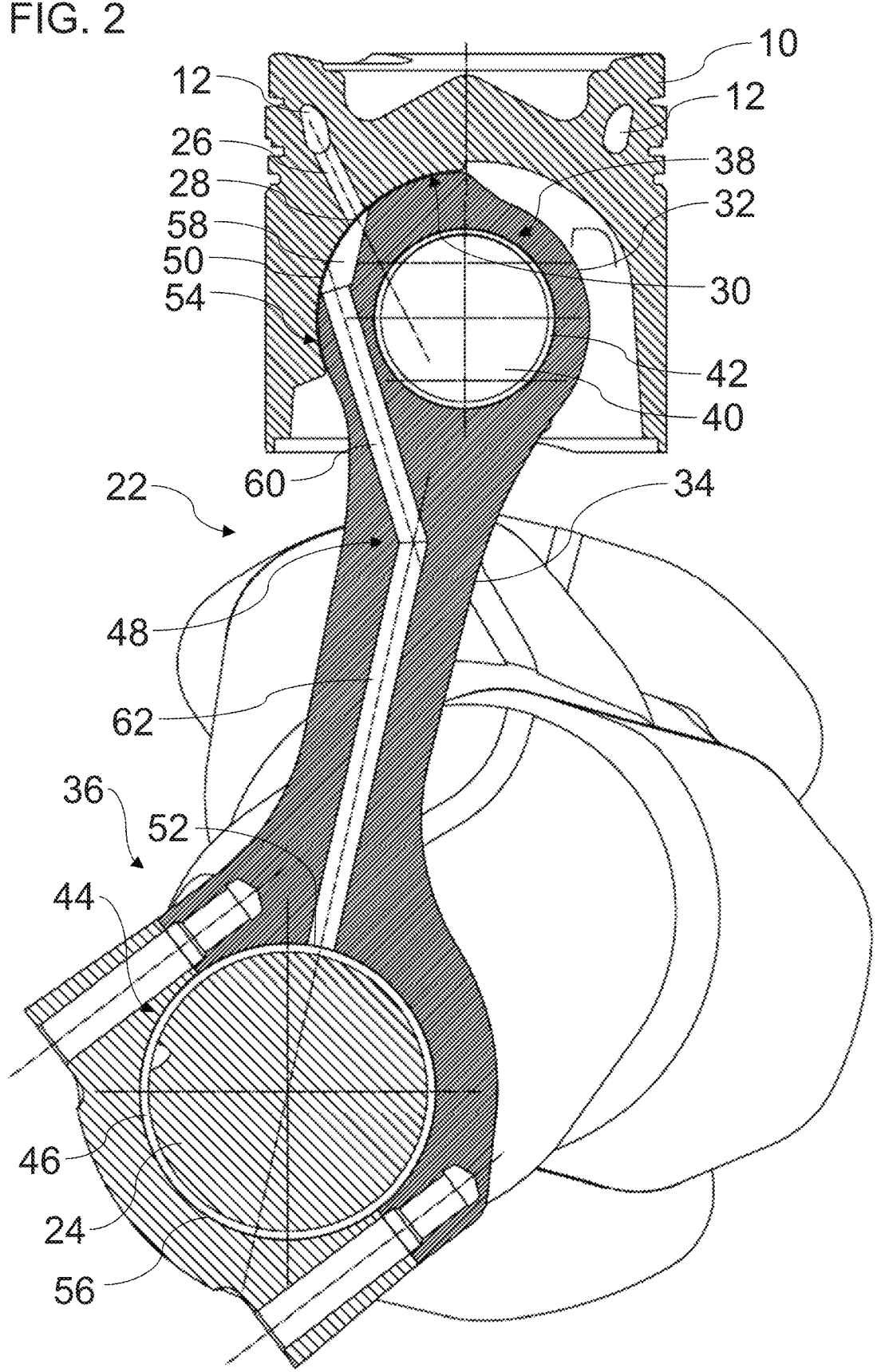
Figure 3:
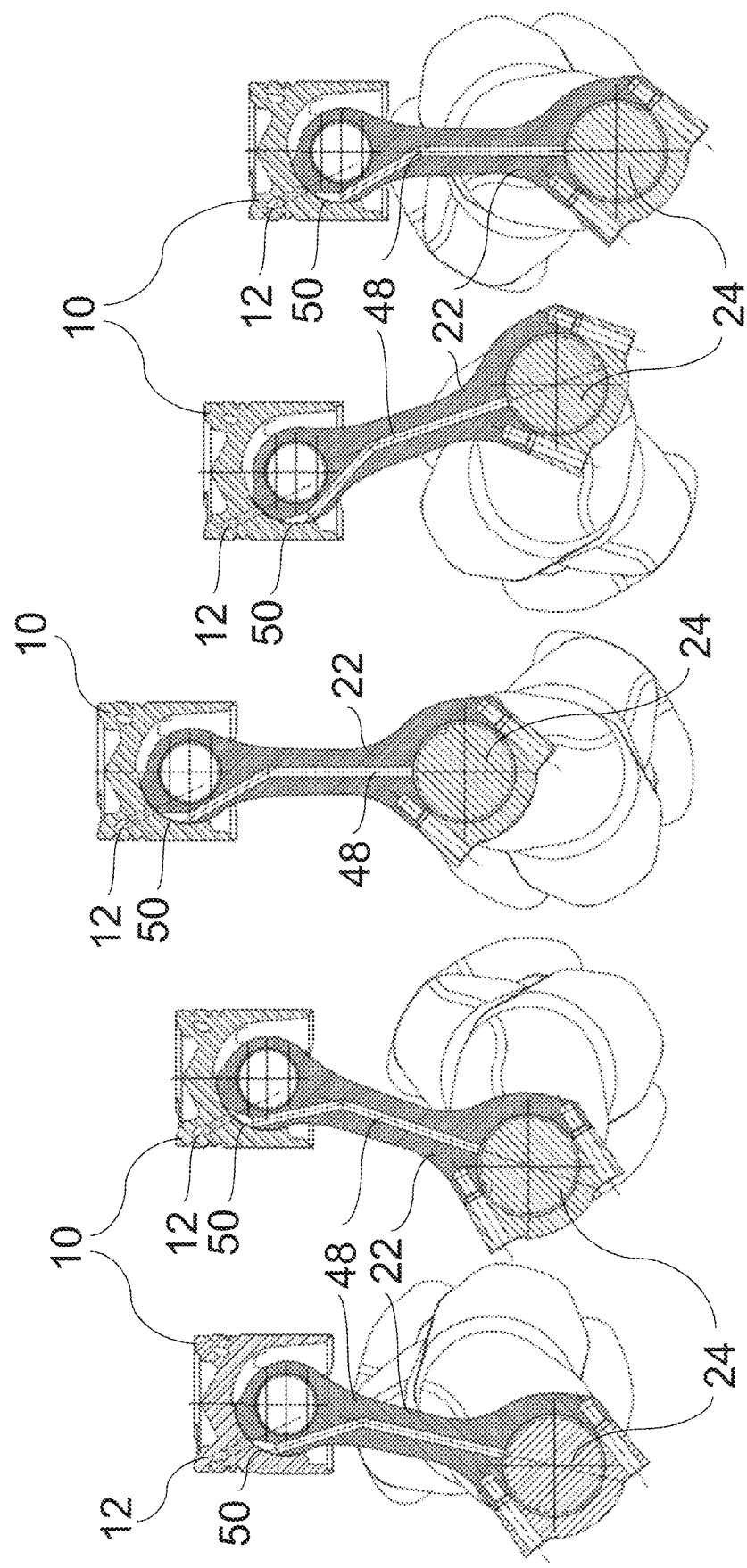

The above-described preferred exemplary embodiments and features of the invention can be combined with one another as desired. Further details and advantages of the invention are described below with reference to the accompanying drawings, which show:

FIG. 1 a sectional view through a piston of an internal combustion engine according to an exemplary embodiment;

FIG. 2 a sectional view through the exemplary piston, a connecting rod and a crankshaft of an internal combustion engine; and FIG. 3 a plurality of mutually adjacently arranged sectional views, which illustrate a movement of the piston and the connecting rod during a rotation of the crankshaft.

The embodiments shown in the figures correspond at least in part, so similar or identical parts are provided with the same reference signs and are also explained via reference to the description of other embodiments or figures to avoid repetition.

In FIG. 1, a piston 10 of an internal combustion engine is illustrated in a sectional plane which is eccentric to a centre axis of the piston 10. The internal combustion engine can be comprised for example in a motor vehicle, in particular a commercial vehicle. The commercial vehicle can be for example a heavy goods vehicle or a bus. The internal combustion engine can have a plurality of cylinders with a plurality of pistons 10.

The piston 10 has a fluid channel 12 formed as an internal piston cooling channel. The fluid channel 12 can extend for example annularly in the interior of the piston 10. A fluid, in particular a cooling lubricating fluid, for example oil, can be injected into the fluid channel 12 by means of a fluid injecting nozzle 14. The fluid injecting nozzle 14 can be secured on a crankcase 16 (merely indicated schematically), for example. The fluid injecting nozzle 14 is directed towards an inlet opening 18 of an inlet channel 20 of the piston 10. The inlet channel 20 leads into the fluid channel 12. Fluid injected through the inlet opening 18 by the fluid injecting nozzle 14 makes its way into the fluid channel 12 via the inlet channel 20. The fluid cools the piston 10 here. The fluid channel 12 can be connected to an outlet channel (not visible in FIG. 1), which is arranged offset from the inlet channel 20 through 180° about the piston centre axis, for example.

In FIG. 2, the piston 10 is illustrated in a further sectional view, wherein the section plane is centric to the centre axis of the piston 10. For the sake of clarity, the fluid injecting nozzle 14 and the crankcase 16 of FIG. 1 are not illustrated in FIG. 2.

The piston 10 is connected in an articulated manner, in particular pivotably, to a crankshaft 24 via a connecting rod 22. The crankshaft 24 is mounted on a crankcase so that it is rotatable about an axis of rotation relative to the crankcase. The piston 10 is capable of translatory movement relative to a cylinder wall of a cylinder (not illustrated). The translatory movements of the piston 10 in the cylinder are converted into a rotatory movement of the crankshaft 24 about its axis of rotation. The piston 10 can be supported on the cylinder wall during its translatory upward and downward movements.

The piston 10 has an outlet channel 26. The outlet channel 26 extends between the fluid channel 12 and an outlet opening 28 in a piston head 30 of the piston 10. Starting from the piston head 30, the outlet channel 26 can be drilled into the piston 10. The outlet opening 28 is arranged in a rounded region of the piston head 30.

The connecting rod 22 has a small end 32, a connecting rod shaft 34 and a big end 36. The connecting rod shaft 34 extends between the small end 32 and the big end 36.

The small end 32 has a small connecting rod eye 38. In the small connecting rod eye 38, a piston pin 40 is mounted in a piston pin bearing 42, formed for example as a slide bearing. The piston pin 40 connects the connecting rod 22 pivotably to the piston 10. In detail, the connecting rod 22 is pivotable within a specified angular range, for example between 30° and 40°, relative to the piston 10 during the upward and downward movements of the piston 10. The piston pin 40 and the piston pin bearing 42 can be lubricated by fluid mist, for example oil mist, which results from the injection of fluid by the fluid injecting nozzle 14 (see FIG. 1). The piston pin 40 is retained axially in the piston 10, e.g. via retaining rings.

The big end 36 has a large connecting rod eye 44. A connecting rod bearing 46 formed as a slide bearing, for example, is received in the large connecting rod eye 44. The connecting rod bearing 46 connects the connecting rod 22 pivotably to a crankpin of the crankshaft 24.

To realise lubrication of the connecting rod bearing 46, the connecting rod 22 has a connecting channel 48. The connecting channel 48 can form a fluid connection between the outlet channel 26 and the large connecting rod eye 44. The fluid channel 12, the outlet channel 26 and the connecting channel 48 therefore form a device for lubricating the connecting rod bearing 46.

The connecting channel 48 extends between an inlet opening 50 and an outlet opening 52. The inlet opening 50 is provided in a rounded circumferential surface 54 of the small end 32. The outlet opening 52 is provided in an inner circumferential surface 56 of the large connecting rod eye 44.

The connecting channel 48 has, by way of example, an inlet region 58, a slant bore 60 and a longitudinal bore 62. The inlet region 58 is formed by a step-shaped recess in the outer circumferential surface 54 of the small end 32. The slant bore 60 extends from a base of the inlet region 58 to the connecting rod shaft 34. The slant bore 60 bypasses the small connecting rod eye 38 and the piston pin 40. The slant bore 60 can be drilled starting from the base of the recess. The slant bore 60 is a bore which is at a slant with respect to the longitudinal axis of the connecting rod 22. The longitudinal bore 62 extends from the inner circumferential surface 56 of the large connecting rod eye 44 through the connecting rod shaft 34 to an end of the slant bore 60. The longitudinal bore 62 can extend, for example, longitudinally or parallel to a centre longitudinal axis of the connecting rod 22. The longitudinal bore 62 can be drilled starting from the inner circumferential surface 56.

In the region of the outlet opening 28 and the inlet opening 50, the piston head 30 and the small end 32 are specifically adapted to one another. The piston head 30 and the small end 32 are machined with respect to one another here so that there is only a small gap between the piston head 30 and the outer circumferential surface 54 of the small end 32. The gap can be smaller than 0.1 cm, in particular smaller than 0.01 cm, for example. The gap can preferably be in a range between 0.01 cm and 0.001 cm. To enable such a gap size to be produced mechanically, the small end 32 and the piston 10 have an increased material thickness in this region. The gap prevents the small end 32 from rubbing against the piston head 30. At the same time, the gap enables a fluid connection between the outlet channel 26 and the connecting channel 48 when the outlet opening 28 and the inlet opening 50 overlap.

As described in detail below with reference to FIG. 3, the piston head 30 in the region of the outlet opening 28 and the small end 32 in the region of the inlet opening 50 sweep over one another during the operation of the internal combustion engine so that an intermittent fluid connection is formed between the fluid channel 12 and the connecting rod bearing 46.

In FIG. 3, the piston 10 is illustrated during an upward and downward movement. In the case of the upward movement, the piston 10 moves from a so-called lower dead centre to a so-called upper dead centre. In the case of the downward movement, the piston moves from the upper dead centre to the lower dead centre.

During the upward movement, the outlet opening 28 and the inlet opening 50 overlap. The overlap takes place within an angular range (for example smaller than 10°, 15° or 20°) which is smaller than the specified angular range within which the connecting rod 22 is pivotably connected to the piston 10. During the upward movement, fluid from the fluid channel 12 is pressed from the outlet opening 28 into the connecting channel 48 via the gap and the inlet opening 50. For example, in this case, fluid pressures up to 6 bar can be achieved as a result of the high acceleration of the connecting rod 22. The fluid can flow to the connecting rod bearing 46 and lubricate this. The fluid can finally flow off into an oil sump, for example via radial bores (not illustrated) in the big end 36.

During the downward movement, the inlet opening 50 is covered by the piston head 30. The covering of the inlet opening takes place within an angular range (for example smaller than 15°, 20° or 25°) which is smaller than the specified angular range within which the connecting rod 22 is pivotably connected to the piston 10. As a result of covering the inlet opening 50, a cavitation tendency of the fluid in the connecting channel 48 during the downward movement can be reduced. The cavitation could otherwise considerably impair a throughflow through the connecting channel 48 during the subsequent upward movement.

The device disclosed herein for lubricating the connecting rod bearing 46 is based on an innovative lubricating method. This method of lubrication comprises feeding, in particular injecting, a fluid, for example oil, into the fluid channel 12 of the piston 10 by means of the fluid injecting nozzle 14. The method further comprises feeding the fluid from the fluid channel 12 to the connecting rod bearing 46 via the outlet channel 26 of the piston 10 and the connecting channel 48 of the connecting rod 22. It is pointed out that, to carry out the method, other configurations, in particular of the outlet channel 26 and the connecting channel 48, are also possible.

The invention is not restricted to the preferred exemplary embodiments described above. Instead, a plurality of variants and modifications is possible, which likewise make use of the inventive idea and therefore fall within the scope of protection. In particular, the invention also claims protection for the subject matter and the features of the subclaims independently of the claims to which they refer. In particular, the features of the independent claim 1 are disclosed independently of one another. In addition, the features of the subclaims are also disclosed independently of all the features of the independent claim 1 and for example independently of the features relating to the presence and/or configuration of the piston and/or the connecting rod of the independent claim 1.

LIST OF REFERENCE SIGNS

10 Piston
12 Fluid channel
14 Fluid injecting nozzle
16 Crankcase
18 Inlet opening
20 Inlet channel
22 Connecting rod
24 Crankshaft
26 Outlet channel
28 Outlet opening
30 Piston head
32 Small end
34 Connecting rod shaft
36 Big end
38 Small connecting rod eye
40 Piston pin
42 Piston pin bearing
44 Large connecting rod eye
46 Connecting rod bearing
48 Connecting channel
50 Inlet opening
52 Outlet opening
54 Outer circumferential surface
56 Inner circumferential surface
58 Inlet region
60 Slant bore
62 Longitudinal bore

The invention claimed is:

1. A device for lubricating a connecting rod bearing on a crankshaft of an internal combustion engine, comprising:
a piston having a fluid channel comprising an internal piston cooling fluid channel, and an outlet channel in fluid communication with the fluid channel;
a connecting rod connected to the piston in a pivotable manner, the connecting rod having a large connecting rod eye and a connecting channel,
wherein:
the large connecting rod eye is configured to receive the connecting rod bearing; and
the connecting channel forms a direct fluid connection between the outlet channel and the large connecting rod eye such that a fluid in the form of a cooling lubricating fluid is fed from the fluid channel to the large connecting rod eye and the connecting rod bearing via the outlet channel and the connecting channel.

2. The device according to claim 1, wherein:
the outlet channel has an outlet opening in a rounded piston head of the piston; and/or
the connecting channel has an inlet opening in a rounded, outer circumferential surface of a small end of the connecting rod.

3. The device according to claim 1, wherein:
the connecting channel has an inlet region formed by a step-shaped recess in an outer circumferential surface of a small end of the connecting rod.

4. The device according to claim 3, wherein the connecting channel further comprises:
a slant bore extending from the recess and, at a spacing from a small connecting rod eye of the connecting rod, through the small end to a connecting rod shaft of the connecting rod; and
a longitudinal bore extending from the large connecting rod eye through the connecting rod shaft to the slant bore.

5. The device according to claim 1, wherein:
a small end of the connecting rod and a piston head of the piston are configured such that a spacing between a region of the piston head which adjoins an outlet opening of the outlet channel and a region of the small end which adjoins an inlet opening of the connecting channel is smaller than 0.1 cm.

6. The device according to claim 5, wherein:
the region of the piston head and the region of the small end sweep over one another during a pivotal movement between the piston and the connecting rod.

7. The device according to claim 1, wherein:
a small end of the connecting rod and a piston head of the piston are configured such that a spacing between a region of the piston head which adjoins an outlet opening of the outlet channel and a region of the small end which adjoins an inlet opening of the connecting channel is smaller than 0.01 cm.

8. The device according to claim 7, wherein:
the region of the piston head and the region of the small end sweep over one another during a pivotal movement between the piston and the connecting rod.

9. The device according to claim 1, wherein:
a piston head of the piston covers an inlet opening of the connecting channel during a movement of the piston from an upper dead center to a lower dead center, in particular for reducing the cavitation tendency in the connecting channel; and/or
an outlet opening of the outlet channel overlaps an inlet opening of the connecting channel during a movement of the piston from a lower dead centre to an upper dead centre.

10. The device according to claim 1, wherein:
a piston head of the piston covers an inlet opening of the connecting channel within an angular range which is smaller than a predetermined angular range within which the connecting rod is pivotably connected to the piston; and/or
an outlet opening of the outlet channel overlaps an inlet opening of the connecting channel within an angular range which is smaller than a predetermined angular range within which the connecting rod is pivotably connected to the piston.

11. The device according to claim 1, wherein:
a fluid connection between the outlet channel and the connecting channel is an intermittent fluid connection and/or exists substantially only during a movement of the piston from a lower dead center to an upper dead center.

12. The device according to claim 1, wherein:
the connecting channel bypasses a small connecting rod eye of the connecting rod and/or a piston pin which connects the connecting rod pivotably to the piston.

13. The device according to claim 1, wherein:
a small end of the connecting rod includes an increased wall thickness in a region through which the connecting channel extends; and/or
the piston includes an increased wall thickness in a region through which the outlet channel extends.

14. The device according to claim 1, further comprising:
a fluid injecting nozzle directed towards an inlet opening of an inlet channel of the piston, the fluid injecting nozzle in fluid communication with the fluid channel.

15. The device according to claim 14, wherein:
the fluid injecting nozzle is provided separately from the piston and from the connecting rod; and/or
the fluid injecting nozzle is received by or secured on a crankcase.

16. A motor vehicle, in particular a commercial vehicle, comprising a device for lubricating a connecting rod bearing on a crankshaft of an internal combustion engine, the device comprising:
a piston having a fluid channel comprising an internal piston cooling fluid channel, and an outlet channel in fluid communication with the fluid channel;
a connecting rod connected to the piston in an articulated, in particular pivotable, manner, the connecting rod having a large connecting rod eye and a connecting channel,
wherein:
the large connecting rod eye is configured to receive the connecting rod bearing; and
the connecting channel forms a direct fluid connection between the outlet channel and the large connecting rod eye such that a fluid in the form of a cooling lubricating fluid is fed from the fluid channel to the large connecting rod eye and the connecting rod bearing via the outlet channel and the connecting channel.

17. A method for lubricating a connecting rod bearing on a crankshaft, comprising:
feeding a cooling lubricating fluid from an internal cooling fluid channel of a piston to the connecting rod bearing via a connecting channel of a connecting rod, the connecting channel forming a direct fluid connection between an outlet channel of the piston, which is in fluid connection with the internal cooling fluid channel, and a large connecting rod eye of the connecting rod, in which the connecting rod bearing is received.

* * * * *